United States Patent
Kim et al.

(10) Patent No.: US 9,661,098 B2
(45) Date of Patent: May 23, 2017

(54) COMMUNICATION METHOD OF NODE OVERHEARING CONTENT IN CONTENT CENTRIC NETWORK AND NODE

(71) Applicants: SAMSUNG ELECTRONICS CO., LTD., Suwon-si (KR); AJOU UNIVERSITY INDUSTRY-ACADEMIC COOPERATION FOUNDATION, Suwon-si (KR)

(72) Inventors: Jae Hoon Kim, Yongin-si (KR); Myeong Wuk Jang, Hwaseong-si (KR); Yung Bae Ko, Suwon-si (KR); Sung Won Lee, Suwon-si (KR)

(73) Assignees: Samsung Electronics Co., Ltd., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 367 days.

(21) Appl. No.: 14/300,365

(22) Filed: Jun. 10, 2014

(65) Prior Publication Data
US 2014/0365599 A1    Dec. 11, 2014

(30) Foreign Application Priority Data
Jun. 11, 2013 (KR) .................. 10-2013-0066716

(51) Int. Cl.
H04L 29/08 (2006.01)

(52) U.S. Cl.
CPC .... *H04L 67/2857* (2013.01); *H04L 29/08729* (2013.01); *H04L 29/08801* (2013.01); *H04L 67/2842* (2013.01); *H04L 67/327* (2013.01)

(58) Field of Classification Search
CPC ....... G06Q 20/12; H04L 1/0076; H04L 67/06; H04L 29/08729; H04L 29/08801; H04L 67/2841; H04L 67/2857; H04W 4/005; H04W 52/0251; H04W 52/0258
See application file for complete search history.

(56) References Cited

U.S. PATENT DOCUMENTS

| | | | |
|---|---|---|---|
| 2002/0154759 A1* | 10/2002 | Ishii | G06Q 20/12 379/373.01 |
| 2009/0288163 A1 | 11/2009 | Jacobson et al. | |
| 2012/0158912 A1 | 6/2012 | Jacobson | |
| 2012/0158973 A1 | 6/2012 | Jacobson et al. | |
| 2013/0039249 A1 | 2/2013 | Ravindran et al. | |
| 2013/0058276 A1* | 3/2013 | Somasundaram | H04L 1/0076 370/328 |
| 2014/0177497 A1* | 6/2014 | Backholm | H04W 52/0251 370/311 |
| 2014/0204816 A1* | 7/2014 | Ismail | H04W 52/0258 370/311 |
| 2014/0379872 A1* | 12/2014 | Eisl | H04L 67/06 709/219 |

(Continued)

FOREIGN PATENT DOCUMENTS

| | | |
|---|---|---|
| AU | 2007 231 759 A1 | 5/2009 |
| JP | 7-52991 A | 2/1995 |

(Continued)

OTHER PUBLICATIONS

Dogar et al., "Ditto—A System for Opportunistic Caching in Multi-hop Wireless Networks," Sep. 14-19, 2008, MobiCom '08, pp. 1-17.*

(Continued)

*Primary Examiner* — Le H Luu
(74) *Attorney, Agent, or Firm* — NSIP Law

(57) ABSTRACT

A communication method of a node in a content centric network, includes overhearing a content transmitted from another node, caching the overheard content, and providing the cached content in response to receiving a packet requesting the cached content.

20 Claims, 7 Drawing Sheets

(56) References Cited

U.S. PATENT DOCUMENTS

2015/0055557 A1* 2/2015 Dong .................... H04W 4/005 370/328

FOREIGN PATENT DOCUMENTS

| KR | 10-2010-0056364 A | 5/2010 |
|---|---|---|
| KR | 10-2012-0060565 A | 6/2012 |
| KR | 10-2012-0095431 A | 8/2012 |
| KR | 10-2013-0013845 A | 2/2013 |

OTHER PUBLICATIONS

Wu et al., "Overhearing-aided Data Caching in Wireless Ad Hoc Networks," 2009, IEEE, pp. 137-144.*

Jacobson, Van, et al. "Networking named content." Proceedings of the 5th international conference on Emerging networking experiments and technologies. ACM, XP002608160 (Submitted: Oct. 13, 2009; Published: Dec. 1-4, 2009): 1-12, (13 pages with coversheet, in English).

Chai, Wei Koong, et al. "Cache "less for more" in information-centric networks (extended version)." Computer Communications vol. 36, No. 7, XP028526440, (Jan. 29, 2013): 758-770.

Kutscher, D. et al. "ICN Research Challenges; draft-kutscher-icnrg-challenges-00.txt", ICN Research Challenges; Draft-Kutscher-ICNRG-Challenges-00.txt, Internet Engineering Task Force, IETF; Standardworkingdraft, Internet Society (ISOC), XP015089905, (Feb. 10, 2013): 1-20.

Wu, Weigang, et al. "Design and performance evaluation of over-hearing-aided data caching in wireless ad hoc networks." IEEE Transactions on Parallel and Distributed Systems, vol. 24, No. 3, XP011489047, (Mar. 1, 2013): 450-463.

Extended European Search Report mailed Nov. 21, 2014 in counterpart European Application No. 14171945.0 (11 pages, in English).

\* cited by examiner

COMMUNICATION METHOD OF NODE OVERHEARING CONTENT IN CONTENT CENTRIC NETWORK AND NODE

CROSS-REFERENCE TO RELATED APPLICATION

This application claims the benefit under 35 USC 119(a) of Korean Patent Application No. 10-2013-0066716, filed on Jun. 11, 2013, in the Korean Intellectual Property Office, the entire disclosure of which is incorporated herein by reference for all purposes.

BACKGROUND

1. Field

The following description relates to a communication method of a node overhearing content in a content centric network (CCN) and the node.

2. Description of Related Art

In a manner contrary to Internet Protocol (IP)-based networking in which source and destination addresses are used, a name-based network, such as a content centric network (CCN), involves representing a name of a desired content in a header of a packet. In this instance, each router configures a routing table to forward the packet to a location in which the content is placed, based on the name of the content written in the packet header. All networking devices including the routers store the content in a cache storage such as a content store (CS).

When a networking device receives a content request packet, the networking device conducts a search of a cache storage of the networking device by the name of the content in the packet header, and when the content is present in the cache storage, the networking device transmits the content to a requester in a form of a packet carrying the content. The name-based network may reduce an average transmission path and a total network usage because the name-based network allows an intermediate node, rather than an original owner, to provide an immediate reply when the corresponding content is present in a cache storage of the intermediate node.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a communication method of a node in a content centric network, the communication method including overhearing a content transmitted from another node, caching the overheard content, and providing the cached content in response to receiving a packet requesting the cached content.

The communication method may further include verifying whether an entry including a name of the overheard content is present in a management table configured to store entries including names of contents, and forwarding the overheard content based on a result of the verification.

The communication method may further include dropping the overheard content in response to the entry comprising the name of the overheard content being verified to be present in the management table.

The forwarding may include forwarding the overheard content to a pre-caching filter in response to the entry including the name of the overheard content being verified to be absent in the management table.

The caching may include caching the overheard content irrespective of whether the node receives the packet.

The caching may include determining whether the overheard content is for a purpose, and caching the overheard content based on a result of the determination.

The purpose may include any one or any combination of unicast traffic, multicast traffic, and broadcast traffic.

The caching may include caching the overheard content in a content store of the node.

The communication method may further include determining whether a name of the overheard content corresponds to a name of a content to be used to filter.

The communication method may further include checking whether an entry comprising the name of the overheard content is present in a pending interest table configured to store entries comprising names of contents requested in response to the name of the overheard content being determined to not correspond to the name of the content to be used to filter.

The name of the content to be used to filter may include information of any one or any combination of a location, a situation, and a service related to the content.

The caching may include caching the overheard content in response to the name of the overheard content being determined to correspond to the name of the content to be used to filter.

The communication method may further include forwarding the overheard content to the pending interest table of the node in response to the name of the overheard content being determined to not correspond to the name of the content to be used to filter.

A non-transitory computer-readable storage medium may store a program including instructions to cause a computer to perform the method.

In another general aspect, there is provided a node in a content centric network, the node including an overhearing module configured to overhear a content transmitted from another node, and a pre-caching module configured to cache the overheard content.

The overhearing module may include a management table configured to store entries including names of contents. The overhearing module may be further configured to verify whether an entry including a name of the overheard content is present in the management table, and forward the overheard content based on a result of the verification.

The overhearing module may be configured to forward the overheard content to a pre-caching filter in response to the entry matched to the name of the overheard content being verified to be absent in the management table.

The pre-caching module may be configured to cache the overheard content irrespective of whether the node receives a packet requesting the overheard content.

The pre-caching module may be configured to determining whether the overheard content is for a purpose, and cache the overheard content based on a result of the determination.

The purpose may include any one or any combination of unicast traffic, multicast traffic, and broadcast traffic.

The node may further include a pre-caching filter configured to determine whether a name of the overheard content corresponds to a name of a content to be used to filter.

The pre-caching module may be configured to cache the overheard content in response to the name of the overheard content being determined to correspond to the name of the content to be used to filter. The pre-caching filter may be further configured to forward the overheard content to a pending interest table of the node in response to the name of the overheard content being determined to not correspond to the name of the content to be used to filter.

Other features and aspects will be apparent from the following detailed description, the drawings, and the claims.

Figure 1:
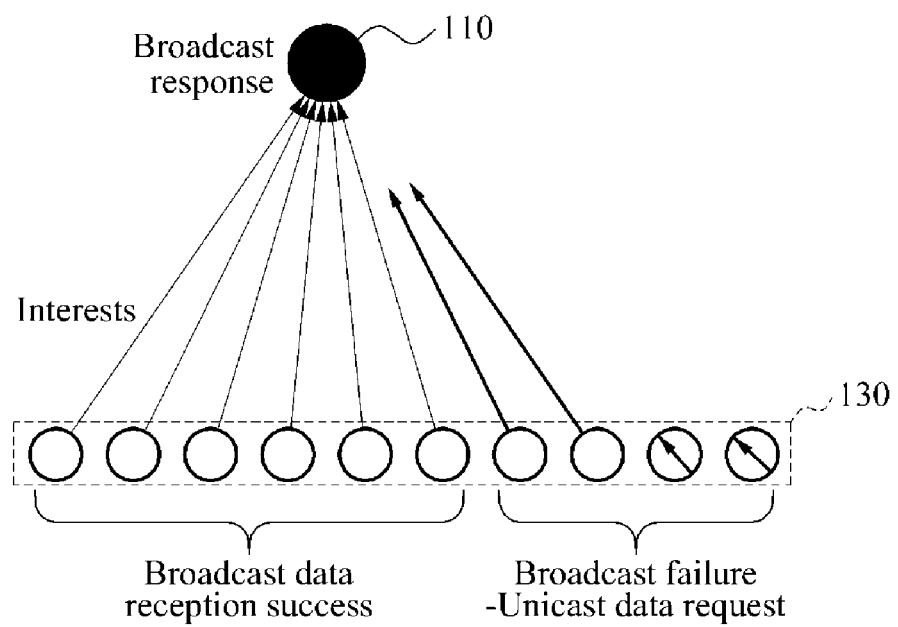
FIG. 1 is a diagram illustrating an example of an operation of a content centric network (CCN) layer in which content requesters request content in a wireless network environment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, a node may be understood as including a networking device, for example, a customer electronics (CE) device, such as user equipment (UE), an access point, a router, and/or other devices known to one of ordinary skill in the art. The CE device may include, for example, smart phones, smart TVs, personal computers (PCs), laptop computers, and/or robot cleaners. A content centric network (CCN) may be a type of information centric network describing various networking architectures in which a content is fetched based on a name of the content, and the following description may be equally applied to an information centric network as well as a CCN.

FIG. 1 is a diagram illustrating an example of an operation of a CCN layer in which content requesters 130 request content in a wireless network environment. Referring to FIG. 1, a protocol operation method in a CCN is centered around transmitting (e.g., via unicast) a content request packet and receiving content in response to the packet. When an arbitrary node, among the content requesters 130, transmits a content request packet in the wireless network environment, a content owner 110 may transmit or broadcast a content in response to the packet.

When the content requesters 130 request the content concurrently from the content owner 110 in the wireless network environment, and the content owner 110 responds to the request, traffic may be concentrated on the content owner 110. A processing delay caused by the content owner 110 processing and responding to all the requests may result in transmission delay of the content.

In an example of requests from the content requesters 130, the content owner 110 or an intermediate node may broadcast or multicast the content in response to the requests, thereby improving a content transmission rate. However, even though the content is broadcast to all the content requesters 130, the content may be dropped before processing of the content request packet requesting the corresponding content. That is, before reception of the content request packet, the content may be dropped rather than being cached even though the broadcast content is received at some of the content requesters 130.

When the same content is requested from the content requesters 130 concurrently, a bottle neck phenomenon may occur in the content owner 110, and accordingly, broadcast or multicast may be needed. However, the content transmitted via broadcast may not be used in the CCN layer until the content request packet is received. A receiving rate may be reduced due to low transmission reliability of broadcast or multicast in the wireless network environment.

Figure 2:
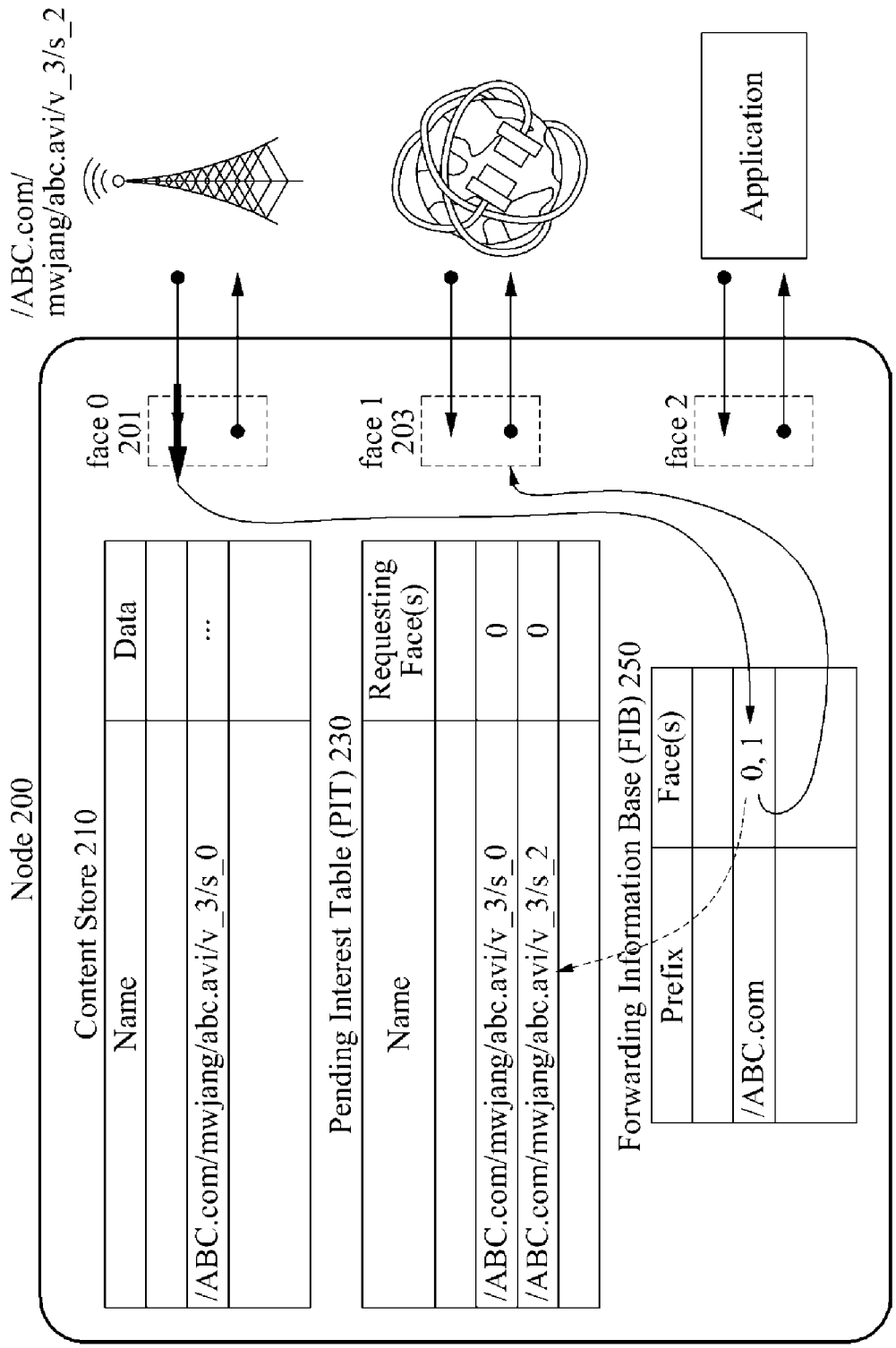
FIG. 2 is a diagram illustrating an example of a method of processing a content request packet in a node in a CCN.

FIG. 2 is a diagram illustrating an example of a method of processing a content request packet in a node 200 in a CCN. Referring to FIG. 2, the example of processing a content request packet in the CCN as an example of an information-based network is illustrated.

The node 200 included in the CCN includes a face 0 201, a face 1 203, a face 2 connected to an application, a content store (CS) 210, a pending interest table (PIT) 230, and a forwarding information base (FIB) 250. The term "face" refers to a path through which a content request packet is received, and may be interchangeable with the term "interface".

When a content request packet requesting a content corresponding to a name, for example, "/ABC.com/mwjang/abc.avi/v_3/s_2", and generated at a neighboring node or an application layer, arrives at a CCN layer via the face 0 201, the node 200 performs processing by transmitting the content request packet to the CS 210, the PIT 230, and the FIB 250 in a sequential order. In detail, the node 200 conducts a search to determine whether the corresponding content is present in the CS 210 based on the name of the content.

When the corresponding content or data is present in the CS 210, the node 200 transmits a response message, for example, a packet carrying the content, via the face 0 201 through which the content request packet is received, in response to the content request packet. When the corresponding content is absent in the CS 210, the node 200 verifies whether an entry stored with the same name of the content is present in the PIT 230. That is, to verify whether the content request packet currently being processed has been previously processed, the node 200 verifies whether the corresponding entry is present in the PIT 230.

When the entry stored with the same name of the content is present in the PIT 230, the node 200 adds, to the corresponding entry, information of the face via which the content request packet is received, that is, a requesting face, in this example, the face 0 201, to recall a direction in which the content request packet is received. When the entry stored with the same name of the content is absent in the PIT 230, the node 200 determines a direction in which the content request packet is to be forwarded through FIB lookup, and forwards the content request packet to a next node.

In this example, the node 200 performs a name-based lookup in the FIB 250. In detail, the node 200 conducts a search for information of a face that corresponds to a prefix of the content name and a matching prefix registered in an entry of the FIB 250, using longest prefix matching, for example, "/ABC.com". The node 200 determines the face to be used to forward the content request packet, in this example, the face 1 203, based on the information registered in the FIB 250, and forwards the content request packet via the face 1 203 to, e.g., the next node.

In this example, the node 200 registers, in the PIT 230, information '0' of the incoming face 0 201 via which the content request packet is received. Registration is performed to transmit a data packet including the corresponding content to a node requesting the corresponding content via the incoming face 0 201 when the data packet is received at future instances. When selecting a face to be used to forward the content request packet based on the FIB 250, the node 200 may exclude the face via which the content request packet is received, in this example, the face 0 201, from face candidates, to avoid a phenomenon in which the content request packet is transmitted iteratively, for example, a loop.

When the node 200 receives the content requested through the content request packet after forwarding the content request packet to the next node, the node 200 examines whether an entry matched to the content request packet is present by referring to the PIT 230. When the matched entry is present in the PIT 230, the node 230 forwards the corresponding content in the direction in which the content request packet is received to, e.g., the neighboring node, and caches the received corresponding content in the CS 210.

As such, the node 200 may receive the content before the content request packet generated at the neighboring node or the application layer arrives at the CCN layer. In this example, in the CCN layer, the node 200 drops the corresponding content because records of messages requesting the corresponding content, for example, records of entries of the PIT 230, are absent.

Figure 3:
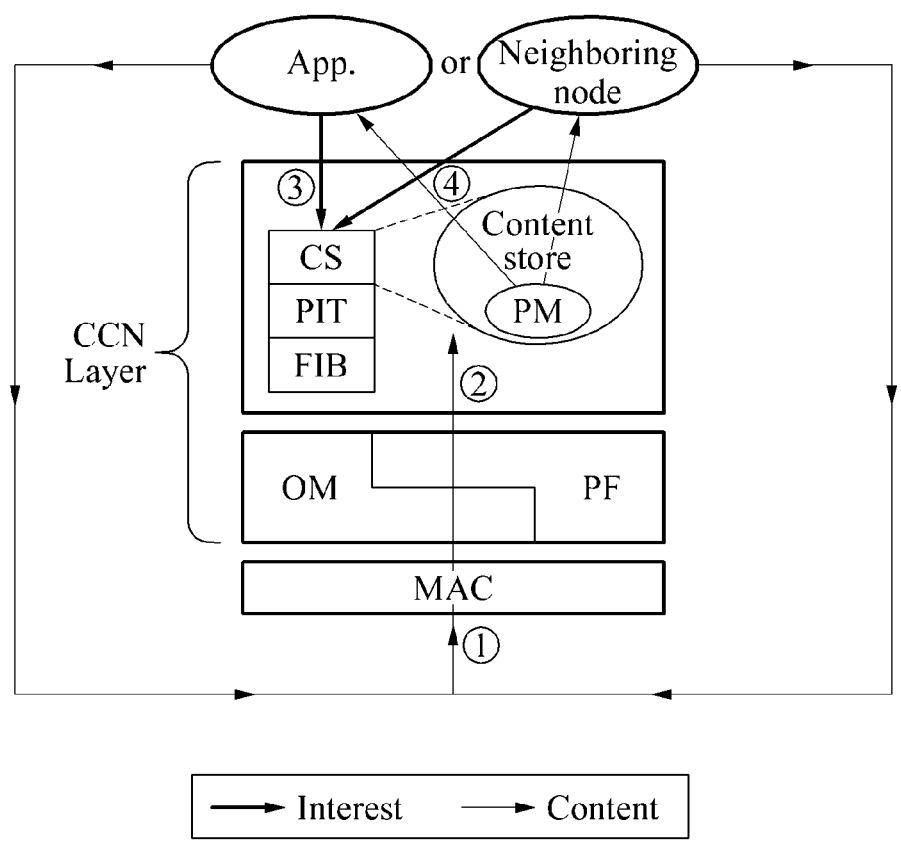
FIG. 3 is a diagram illustrating an example of a structure of a CCN layer that provides an overheard content in a CCN.

FIG. 3 is a diagram illustrating an example of a structure of a CCN layer that provides an overheard content in a CCN. Referring to FIG. 3, in a wireless environment, the CCN layer allows content overhearing of a neighboring node or application layer (operation 1). Also, the CCN layer allows pre-caching of the overheard content in a CS (operation 2). The pre-caching is performed by a pre-caching module (PM). Subsequently, the CNN layer receives a content request packet, also referred to as an interest, which is generated from the application layer or the neighboring node (operation 3). When a content requested by the content request packet matches the content pre-cached in the CS, the CCN layer provides the content cached in the CS to the neighboring node or the application layer (operation 4).

The CCN layer may provide the content more quickly by enabling internal processing of the content request packet generated from the application layer or the neighboring node. The CCN layer may suppress the content request packet from being transmitted to the outside by enabling internal processing of the content request packet in the CS of the node, thereby reducing consumption of radio resources.

Through content overhearing, the CCN layer may allow activation of distribution of network traffic by responding to the request from the neighboring device, using the pre-cached content, instead of a content owner. A communication method of a node overhearing a content described in the following may be equally applied to a wired network environment allowing overhearing as well as a wireless network environment.

Figure 4:
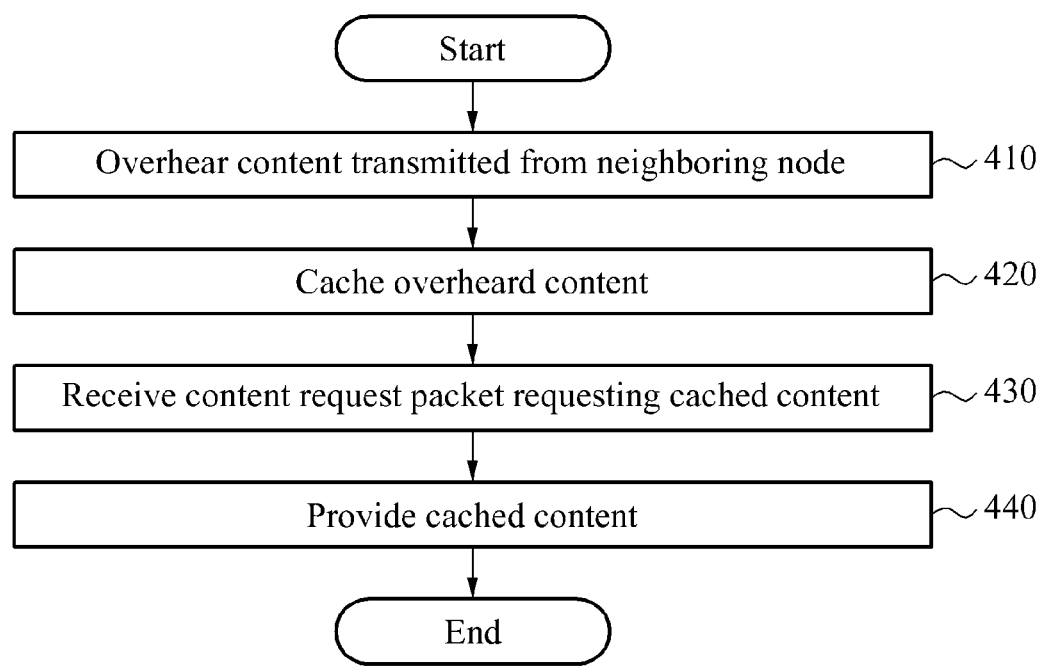
FIG. 4 is a flowchart illustrating an example of a communication method of a node in a CCN.

FIG. 4 is a flowchart illustrating an example of a communication method of a node in a CCN. Referring to FIG. 4, in operation 410, the node overhears a content transmitted from a neighboring node.

In operation 420, the node caches the overheard content in a caching device.

Generally, when a content is received before processing of a corresponding content request packet in a CCN layer, the content is not cached in a CS of the node. For example, when a content unmatched to an entry of a PIT of the node is received, the CCN layer does not allow the content to be cached in the CS.

In the example of FIG. 4, by expanding a function of the CS, the overheard content is pre-cached even though the overheard content is received before arrival of a corresponding content request packet. That is, even though the overheard content is unmatched to an entry of a PIT, the overheard content is temporarily stored. In this example, the overheard content may be cached in the CS or a cache provided separately for pre-caching of the node.

The node may transmit the cached content to a plurality of nodes as, for example, unicast traffic, broadcast traffic, or multicast traffic. That is, the cached content may have a transmission type. If the cached content is transmitted to the nodes via broadcast or multicast, and a receiving node overhears the content in the CCN layer, transmission performance of broadcast or multicast may be improved.

When a content request packet generated from an application layer arrives at the CCN layer, the overheard and cached content may be transmitted to the application layer immediately. Accordingly, limited radio resources may be saved because the content request packet is processed internally rather than externally. Also, when a content request packet for the corresponding cached content is received from a neighboring node, the node in which the overheard content is cached may process the content request packet locally rather than transmitting the content request packet to a content owner.

In operation 430, the node receives, from another node, the content request packet requesting the cached content.

In operation 440, the node provides the cached content to the other node in response to the receiving of the content request packet.

Figure 5:
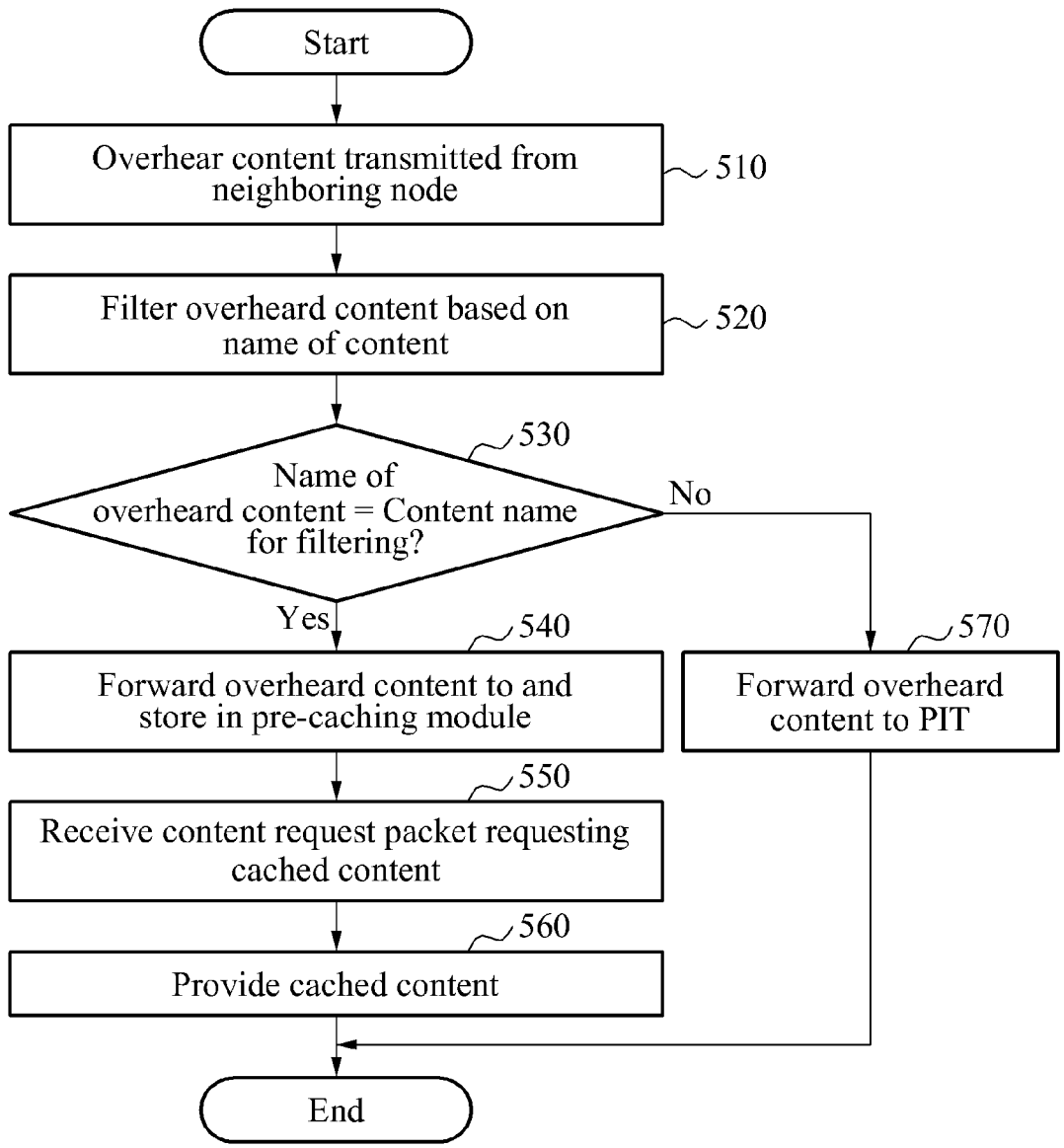
FIG. 5 is a flowchart illustrating another example of a communication method of a node in a CCN.

FIG. 5 is a flowchart illustrating another example of a communication method of a node in a CCN. Referring to FIG. 5, in operation 510, the node overhears a content transmitted from a neighboring node.

In operation 520, the node filters the overheard content based on a name of a content to be used to filter. The content name to be used to filter may include information of at least one of a location, a situation, and a service that are related to the content. The location related to the content may include, for example, a shopping mall, a classroom, and/or other locations known to one of ordinary skill in the art. The situation related to the content may include, for example, an e-meeting. The service related to the content may include, for example, a communication service type, such as a multicast traffic service and a broadcast traffic service, a sports game, a smart class, and/or other services known to one of ordinary skill in the art. High-quality, high-capacity contents, for example, a sports game, e-meetings, and/or a smart class, may be distributed even in an infra-less environment by using the overheard content when providing a requested content.

In other examples, the content name to be used to filter may include information of a period of time over which the overheard content is cached, and/or information of a period of time over which the overheard content is cached in a space. For example, the content name to be used to filter may include information of a period of time that enables a content overheard during an e-meeting to be maintained in a CS of the node during a corresponding situation, that is, during the e-meeting.

In operation 530, the node determines whether a name of the overheard content matches the content name to be used to filter. When the name of the overheard content is determined to match the content name to be used to filter, the node continues in operation 540. Otherwise, the node continues in operation 570.

In operation 540, the node forwards the overheard content to a pre-caching module, and caches the overhead content in, e.g., the CS.

In operation 550, the node receives, from another node, a content request packet requesting the cached content.

In operation 560, the node provides the cached content to the other node in response to the receiving of the content request packet.

In operation 570, the node forwards the overheard content to a PIT of the node.

Figure 6:
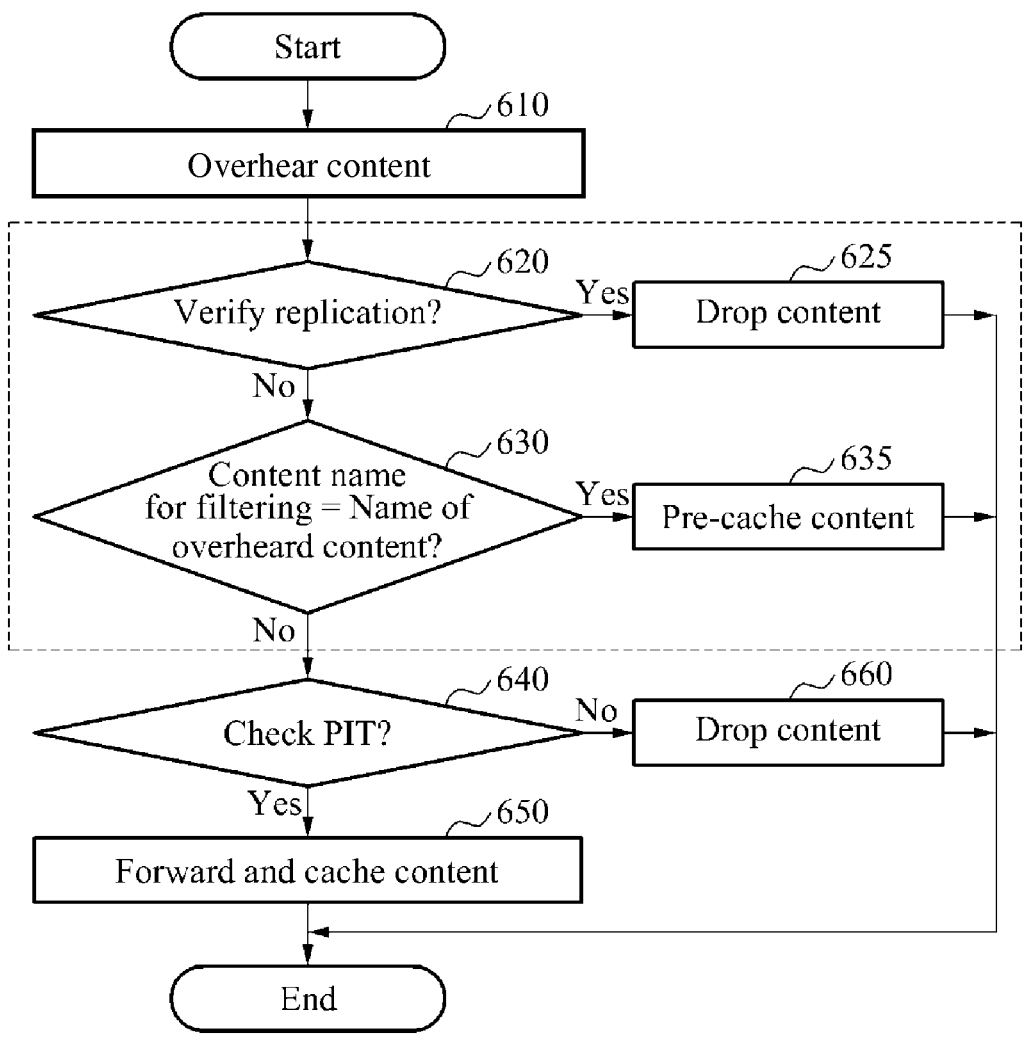
FIG. 6 is a flowchart illustrating still another example of a communication method of a node in a CCN.

FIG. 6 is a flowchart illustrating still another example of a communication method of a node in a CCN. Referring to FIG. 6, in operation 610, the node overhears a content transmitted from a neighboring node, or receives a content from an upper layer, for example, an application layer.

In operation 620, the node verifies whether replication or overlapping of the overheard or received content exists, using an overhearing module. That is, the node determines whether an entry matched to a name of the overheard or received content is present in a management table. The management table may be included in the overhearing module, and may store entries including names of contents overheard from the neighboring node or received from the application layer. The node may determine whether to forward the overheard or received content based on a result of the determination. Hereinafter, the overheard content may be understood as including the content received from the upper layer. When the entry matched to the name of the overheard content is present in the management table, the node continues in operation 625. Otherwise, the node continues in operation 630.

In operation 625, the node drops the overheard content, and terminates the method. The presence of the entry matched to the name of the overheard content implies a presence of a same content overheard previously. Accordingly, to reduce a waste of network resources caused by caching the same content iteratively for each layer, the overheard content is dropped.

In operation 630, the node forwards the overheard content to a pre-caching filter. That is, the node determines whether the name of the overheard content matches a content name to be used to filter, using the pre-caching filter. When the name of the overheard content matches the content name to be used to filter, the node continues in operation 635. Otherwise, the node continues in operation 640.

In operation 635, the node pre-caches the overheard content, using a pre-caching module, and terminates the method. The matching of the name of the overheard content to the content name to be used to filter implies that the overheard content is for a preset purpose. Accordingly, the overheard content for the preset purpose is pre-cached. The preset purpose may include at least one of unicast traffic, multicast traffic, and broadcast traffic.

In operation 640, the node processes the overheard content like a non-overheard content. That is, the node checks whether an entry corresponding to the overheard content is present in a PIT of the node. When the entry corresponding to the overheard content is present in the PIT, the node continues in operation 650. Otherwise, the node continues in operation 660.

In operation 650, the node forwards the overheard content to another node requesting the overheard content. Also, the node caches the overheard content in a CS of the node.

In operation 660, the node determines that there is no node requesting the overheard content, and drops the overheard content.

The node may overhear a content request packet transmitted from a neighboring node as well as the content. The node may process the overheard content request packet in the same method as the overheard content. The methods described through FIGS. 4 through 6 may be equally applied to the node overhearing the content request packet.

Figure 7:
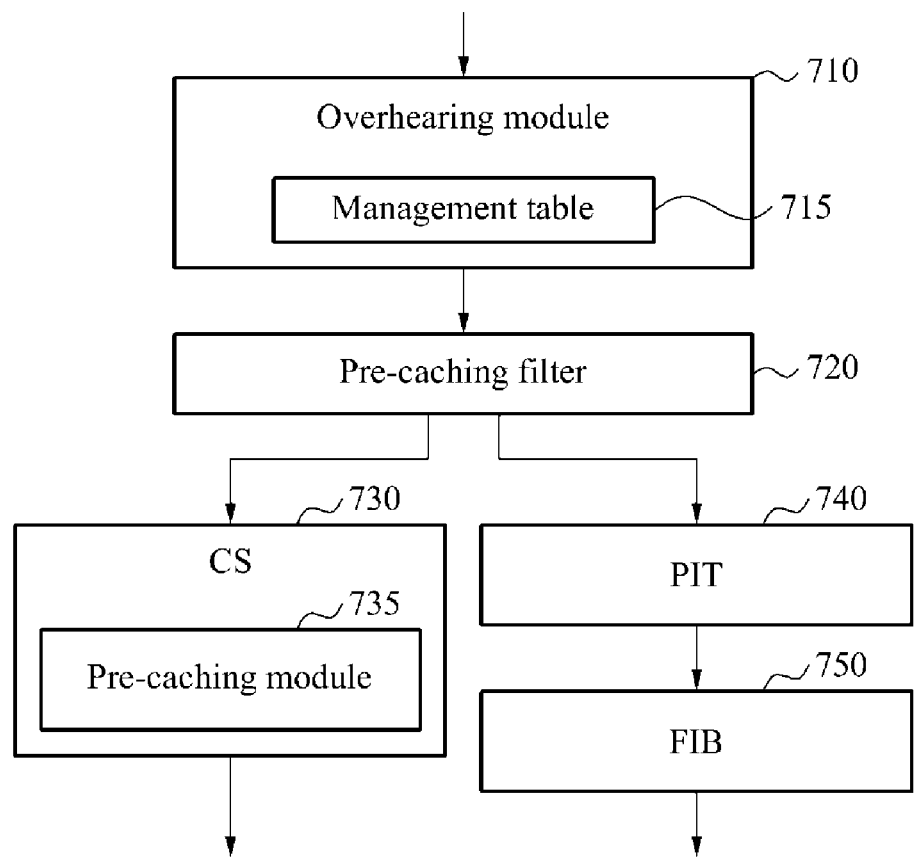
FIG. 7 is a block diagram illustrating an example of a node in a CCN.

FIG. 7 is a block diagram illustrating an example of a node 700 in a CCN. Referring to FIG. 7, the node 700 includes an overhearing module 710, a pre-caching filter 720, a CS 730, a PIT 740, and an FIB 750.

The overhearing module 710 overhears a content transmitted from a neighboring node. The overhearing module 710 includes a management table 715 that stores an entry including a name of at least one overheard content.

The overhearing module 710 may determine whether to forward the overheard content based on whether an entry matched to a name of the overheard content is present in the management table 715. For example, the overhearing module 710 may suppress the overheard content from being forwarded to a pre-caching module 735 or the pre-caching filter 720 when the entry matched to the name of the overheard content is present in the management table 715. When the entry matched to the name of the overheard content is absent in the management table 715, the overhearing module 710 may forward the overheard content to the pre-caching module 735 or the pre-caching filter 720.

The pre-caching filter 720 filters the overheard content based on a name of a content to be used to filter. That is, when the name of the overheard content matches the content name to be used to filter, the pre-caching filter 720 forwards the overheard content to the pre-caching module 735. When the name of the overheard content does not match the content name to be used to filter, the pre-caching filter 720 forwards the overheard content to the PIT 740.

The CS 730 includes the pre-caching module 735. The pre-caching module 735 caches the content overheard by the overhearing module 710. The pre-caching module 735 may cache the overheard content irrespective of whether the node receives a content request packet requesting the overheard content. The pre-caching module 735 may pre-cache the overheard content based on whether the overheard content is for a predetermined purpose. The predetermined purpose may include at least one of multicast traffic and broadcast traffic.

For basic operations of the CS 730, the PIT 740, and the FIB 750, reference may be made to the description of FIG. 2.

The examples of a CCN layer described may improve broadcast and multicast efficiency by pre-caching, in a CS, a packet received through content overhearing and by performing internal processing of a content request packet generated from an application layer or a neighboring node. Further, the CCN layer may suppress the content request packet from being transmitted externally by enabling the internal processing of the content request packet via the CS of the node, thereby reducing consumption of radio resources. Also, the CCN layer may improve activation of distribution of network traffic by responding to the request from the neighboring node, using the content pre-cached through the content overhearing, instead of using a content owner.

The various modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication method of a node in a content centric network, the communication method comprising:
   overhearing a content transmitted from another node;
   verifying whether an entry comprising a name of the overheard content is present in a management table configured to store entries comprising names of contents;
   dropping the overheard content in response to the entry comprising the name of the overheard content being verified to be present in the management table;
   forwarding the overheard content to a pre-caching filter in response to the entry comprising the name of the overheard content being verified to be absent in the management table; and
   caching the overheard content.

2. The communication method of claim 1, further comprising:
   providing the cached content in response to receiving a packet requesting the cached content.

3. The communication method of claim 1, wherein the caching comprises:
   caching the overheard content irrespective of whether the node receives the packet.

4. The communication method of claim 1, wherein the caching comprises:
   determining whether the overheard content is for a purpose; and
   caching the overheard content based on a result of the determination.

5. The communication method of claim 4, wherein the purpose comprises any one or any combination of unicast traffic, multicast traffic, and broadcast traffic.

6. The communication method of claim 1, wherein the caching comprises:
   caching the overheard content in a content store of the node.

7. The communication method of claim 1, further comprising:
   determining whether a name of the overheard content corresponds to a name of a content to be used to filter.

8. The communication method of claim 7, further comprising:
   checking whether an entry comprising the name of the overheard content is present in a pending interest table configured to store entries comprising names of contents requested in response to the name of the overheard content being determined to not correspond to the name of the content to be used to filter.

9. The communication method of claim 7, wherein the name of the content to be used to filter comprises information of any one or any combination of a location, a situation, and a service related to the content.

10. The communication method of claim 7, wherein the caching comprises:
    caching the overheard content in response to the name of the overheard content being determined to correspond to the name of the content to be used to filter.

11. The communication method of claim 7, further comprising:
    forwarding the overheard content to the pending interest table of the node in response to the name of the overheard content being determined to not correspond to the name of the content to be used to filter.

12. A non-transitory computer-readable storage medium storing a program comprising instructions to cause a computer to perform and comprise:
    overhearing a content transmitted from another node;
    verifying whether an entry comprising a name of the overheard content is present in a management table configured to store entries comprising names of contents;
    dropping the overheard content in response to the entry comprising the name of the overheard content being verified to be present in the management table;
    forwarding the overheard content to a pre-caching filter in response to the entry comprising the name of the overheard content being verified to be absent in the management table; and
    caching the overheard content.

13. A node in a content centric network, the node comprising:

a processor configured to
overhear a content transmitted from another node,
verify whether an entry comprising a name of the overheard content is present in a management table configured to store entries comprising names of contents,
drop the overheard content in response to the entry comprising the name of the overheard content being verified to be present in the management table, and
forward the overheard content to a pre-caching filter in response to the entry comprising the name of the overheard content being verified to be absent in the management table.

14. The node of claim 13, wherein the management table is configured to store entries comprising the names of contents.

15. The node of claim 13, wherein the processor comprises an overhearing module configured to forward the overheard content based on a result of the verification.

16. The node of claim 13, further comprising:
a pre-caching module configured to
cache the overheard content irrespective of whether the node receives a packet requesting the overheard content.

17. The node of claim 16, wherein the pre-caching module is configured to:
determining whether the overheard content is for a purpose; and
cache the overheard content based on a result of the determination.

18. The node of claim 17, wherein the purpose comprises any one or any combination of unicast traffic, multicast traffic, and broadcast traffic.

19. The node of claim 13, further comprising:
a pre-caching filter configured to determine whether a name of the overheard content corresponds to a name of a content to be used to filter.

20. The node of claim 19, wherein:
the pre-caching module is configured to cache the overheard content in response to the name of the overheard content being determined to correspond to the name of the content to be used to filter; and
the pre-caching filter is further configured to forward the overheard content to a pending interest table of the node in response to the name of the overheard content being determined to not correspond to the name of the content to be used to filter.

* * * * *